2,789,057
Patented Apr. 16, 1957

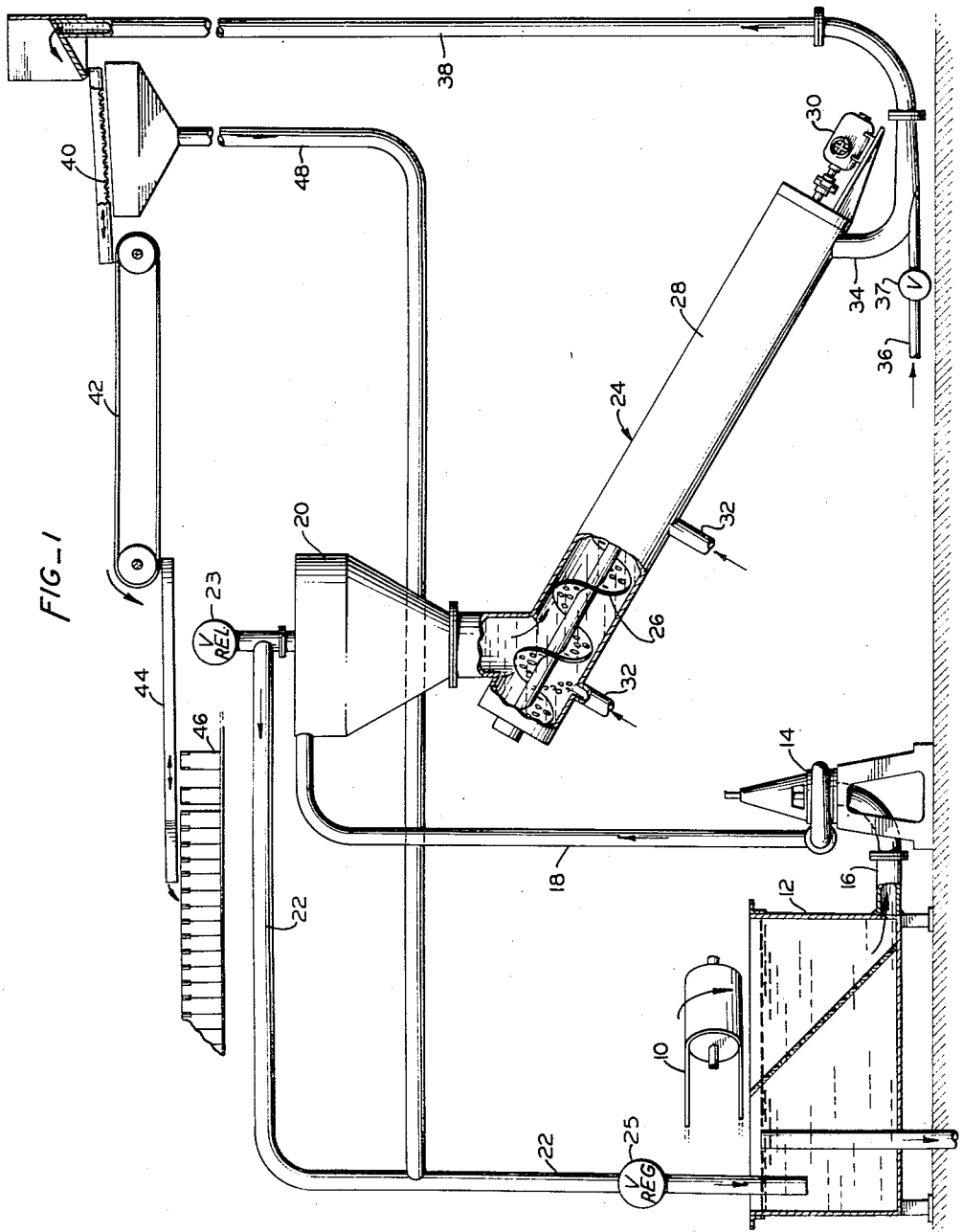

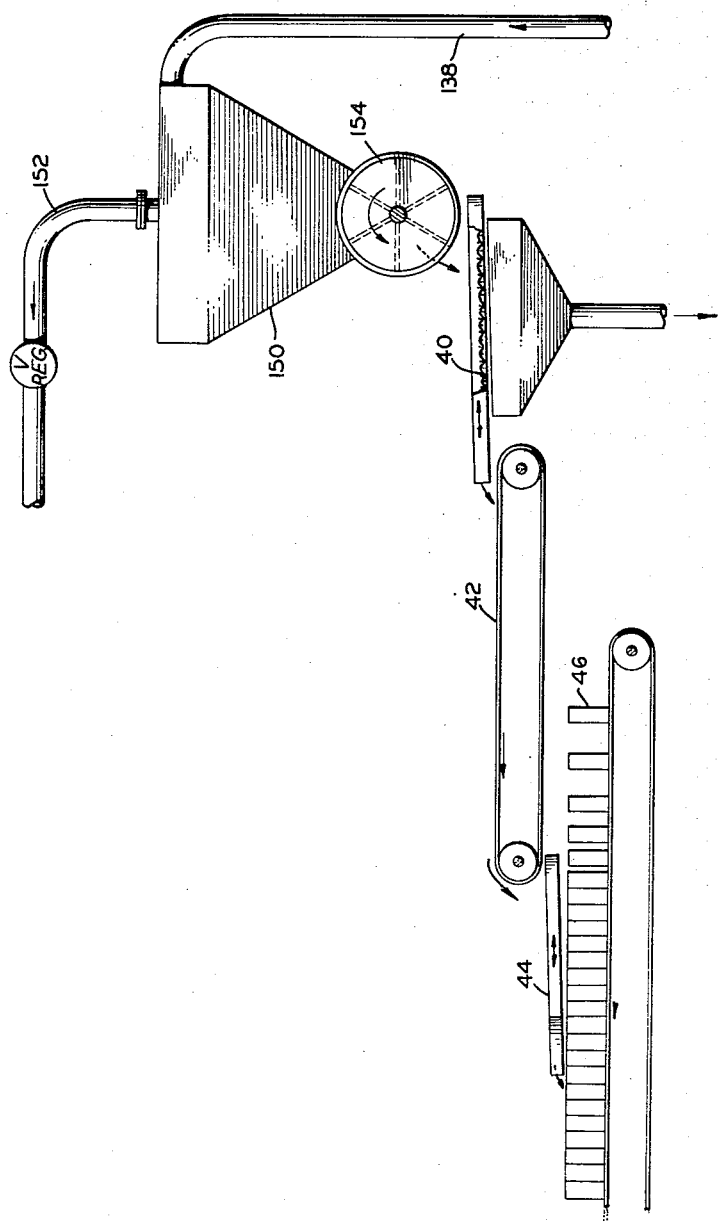

2,789,057

METHOD OF TREATING DRIED FRUITS

Theodor A. Schwarz, Los Gatos, Calif., assignor to California Prune and Apricot Growers Association, San Jose, Calif., a corporation of California Application December 27, 1955, Serial No. 555,402

4 Claims. (Cl. 99—104)

This invention relates to the treatment of dried fruit, such as prunes and the like, prior to the packaging thereof, and more particularly to a process which provides a product having improved appearance, texture, flavor and keeping quality.

One objective which has never been fully attained in the treating of dried fruit, and dried prunes in particular, is the obtaining of an end product which is soft textured, which shows a very minimum of heat damage, and which has a uniform moisture content below the critical value. Many different attempts have been made in connection with the treatment of dried prunes to obtain such an end product, including the water bath method which is most prevalently used today, the saturated steam method, and a combination of these two, or a combination of the water bath method together with some supplemental treatment.

Generally speaking, these prior art methods are deficient from at least one important standpoint. If softness of the end product is obtained by raising the moisture content, the product becomes so perishable in nature that it requires packaging under almost sterile conditions in containers which accord the ultimate in protection against air borne contamination by mold spores. On the other hand, if softness is achieved by a breaking down of the fruit structure through the action of heat, the end product is severely damaged and has impaired flavor and possibly lowered nutritional value.

As practiced, the water bath method, which consists in immersing the dried prunes in water maintained at its boiling temperature, results in prunes having a non-uniform moisture content. This is due to the fact that the fruit is placed in bucket-like containers in the water, with the result that the prunes toward the center of the buckets heat up much slower than the prunes which are disposed toward the peripheries of the buckets. Consequently, the outside prunes pick up more moisture than the inside ones. More importantly, the water bath method causes the fruit to imbibe moisture at such a rate that the fruit reaches the limiting moisture content long before it is cooked in the sense of being tenderized. For example, it normally takes 8–10 minutes to raise the moisture content of dried prunes to 27%, but in order to break down the texture of the fruit, particularly that of the skin of the fruit, at least another 10 minutes of exposure to a temperature of 212° F., without corresponding increase in moisture content, is required. The water bath method therefore calls for some form of supplemental heat treatment, such as, for example, the packing of the prunes in containers in the hot condition and allowing the containers to gradually cool. In order to obtain the benefit of the combined heat effect of the fruit, the containers are piled into a stack, but this results in a condition where the fruit within containers at the outside of the stack may receive a negligible amount of heat treatment while the fruit within the containers buried within the center of the stack may be overly heat treated to the point of inedibility.

The saturated steam method consists in the subjecting of the fruit to the action of saturated steam, rather than boiling water, for the purpose of obtaining soft textured fruits of limited moisture content. The rate of moisture absorption by the fruit in a saturated steam atmosphere is, however, so low that by the time the fruit has absorbed sufficient moisture it has become severly caramelized. Furthermore, steam processed fruits have characteristically dark flesh and their skins are covered with a syrupy film which decreases their marketability.

Numerous attempts have also been made to overcome the above-mentioned disadvantages of the water bath method, the water bath method plus the hot packing method, and the saturated steam method, as by combining the water bath method and the saturated steam method. In such an overall process, the fruit is first immersed in boiling water until it reaches the desired moisture content and it is then retorted at a higher temperature level in the presence of saturated steam for the purpose of tenderizing the fruit without disturbing the previously established moisture content. While thermal damage is thereby reduced over that produced by the straight steam process, the end product has essentially the poor quality characteristics of steamed fruit. Added to this is the economic disadvantage inherent in such a combination process resulting from higher first costs, maintenance and operating expenses.

The essential object of the present invention is to provide a process in which the requisite moisture addition and tenderizing heat treatment is carried out simultaneously to produce a soft textured end product of optimum quality.

This object is accomplished by submerging the dried prunes in water, rapidly raising the temperature of the water considerably above its normal boiling point while preventing actual boiling, maintaining the water at such high temperature for a short period of time, and then abruptly reducing the temperature of the water to a temperature considerably below its normal boiling point. More specifically, the water is rapidly heated to a temperature of about 120° C. while it is maintained at a pressure sufficient to prevent vapor formation, held at this temperature for 4–5 minutes, and then reduced to a temperature of approximately, but preferably not less than, 60° C.

Under these conditions, the hydration of the fruit and the tenderizing of the fruit proceed at substantially the same rate and are completed at substantially the same time, and there is no deleterious effect resulting from the elevated temperature condition as far as non-enzymatic browning is concerned.

I have found that an increase of 10° C. in the water temperature speeds up the rate of hydration by about 40% over a wide temperature range. At a water temperature of 120° C., the rate of hydration is approximately twice as high as it is at 100° C., and consequently substantially the same amount of water is taken up by the fruit at 120° C. in half the time required for the fruit to take up the same amount of water at 100° C. In other words, where the normal water bath method requires immersion of the prunes for 8–10 minutes at 100° C. to reach the desired moisture content of approximately 27%, it take only 4–5 minutes of immersion in water at 120° C. to take up the same amount of moisture.

I have further found that an increase in the water temperature causes the rate of tenderization to be accelerated even more than the rate of hydration. It appears that the rate of tenderization is actually doubled for each 10° C. temperature increase. Thus, the rate of tenderization at 120° C. is approximately four times as high as it is at 100° C. In effect, this means that prunes which are only half tenderized by an 8–10 minute immersion in water at 100° C. will be fully tenderized by a 4–5 minute immersion in water at 120° C.

The rate of non-enzymatic browning for prune and prune products triples with every 10° C. temperature increase. Thus, it would appear at first glance that the amount of dark substances formed at 120° C. would be approximately four and one-half times as high at the conventional processing temperature of 100° C. However, I have found that due to the low thermal conductivity of the fruit flesh, the flesh temperature lags considerably behind the surface temperature. While the skin of the fruit may come to the temperature of the surrounding medium in a matter of seconds, it takes in excess of 4–5 minutes at the temperature 120° C. before the temperature of the interior of the fruit reaches a dangerous level. Before that happens, the heat flow into the body of the fruit is reversed by the abrupt temperature reduction step of the water which is an important aspect of the subject process.

Figure 1 shows a form of integrated apparatus whereby the subject process can be carried out; and Figure 2 shows an alternate form of fruit discharging device for the apparatus.

With reference to Figure 1, the fruit is fed, as by feed belt 10, into a water-containing sump, or feed hopper, 12. A pump 14 which is connected to the hopper 12 by conduit 16 forces the prunes and water mixture through conduit 18 to a water separator 20. The pump 14 is of the non-clog centrifugal type having the necessary performance characteristics to overcome friction losses within the system and to maintain a static pressure at the terminus of the system in excess of the vapor pressure of the water at the operating temperature of the processor element of the apparatus. The pump requires a high water to fruit ratio, usually more than 6:1, and since it would be uneconomical to heat and cool all of this excess water in the processor element, the water separator 20 is employed to lower the water to fruit ratio by separating out the surplus water.

Separator 20 is of the cyclone-type. The water-fruit mixture enters an annular space in the separator in a tangential direction, and the fruit, through the combined action of centrifugal and gravitational forces, settles in a spiral path to the bottom of the cone-shaped separator. The surplus water is discharged through a centrally located opening in the top of the separator and it passes through conduit 22 to the hopper 12. Elements 23 and 25 are, respectively, an air release valve and a pressure regulator valve.

The water-fruit mixture leaving the lower end of separator 20 passes into the processor element 24 which comprises a fruit conveyor 26 which is enclosed within a pressure-type cylinder 28 which is rotated by a variable speed motor 30.

Aside from the high temperature hydration and tenderization function of the processor 24, its principal function is to maintain a closely and positively controllable rate of flow, rather than random flow of the fruit through the high temperature reaction zone. Due to the fact that the processor is always full of water, the buoyancy of the fruit minimizes the pressure on the lower layers of fruit, and because the flow of the water is from left to right the fruit tends to congregate toward the forward edge of the helix. The fruit conveyor also acts to restrain the fruit from traveling at the rate of the water passing through the processor. The processor is disposed in an inclined position in order to reduce to a minimum the possibility of fruit lagging behind and being injured by the following edge of the screw blade.

At several points along the length of the conveyor, conduit means, such as those indicated at 32, are provided for the purpose of admitting high pressure steam into the processor. The amount of steam introduced into the processor is so regulated that a preset temperature, preferably approximately 120° C., is maintained throughout the processor. The variable speed motor 30 is set to drive the conveyor at a rate of travel to move the prunes through the processor in a timed period of 4–5 minutes when the temperature of the water within the processor is at 120° C.

The water-fruit mixture passes from the processor 24 into conduit 34. Cold water is forced into conduit 34 through conduit 36 containing control valve 37 to abruptly chill the water-fruit mixture to a temperature well below the normal boiling point of water. The primary object of chilling the mixture is to cool the fruit to prevent any tendency of it to explode upon being released from the apparatus to an atmospheric pressure condition. If the mixture is cooled below 60° C., the fruit wax, which is in the form of a molten layer on the fruit, will set up in white masses and render the end product unsightly. For that reason, it is important that the cooling be controlled so that the temperature of the mixture is not reduced below 60° C.

The cooled water-fruit mixture passes into standpipe 38 which is of sufficient height to keep the water in the processor 24 from boiling. The fruit is then discharged onto a screen 40. It is received by a conveyor 42 and moved to carton feed shaker 44 and from there to cartons 46. The water component of the mixture passes into downpipe 48 and from there to conduit 22 and hopper 12.

Figure 2 illustrates on alternate way of maintaining the system under constant pressure. The standpipe 38 of Figure 1 is eliminated, and instead the cooled water-fruit mixture passes through conduit 138 into a separator 150. The water is separated out from the mixture and returned to the hopper via conduit 152, and the prunes are discharged from the separator 150 through a rotary discharge valve 154 which also serves as a mechanical feed wheel. The water-fruit mixture is thus removed from the apparatus in a continuous manner without causing any appreciable pressure drop in the system.

While specific apparatus has been shown whereby the subject process may be practiced, it is to be understood that other types of equipment may be employed and that the process is subject to modification and variation within the spirit of the invention and the scope of the appended claims.

What is claimed is:

1. A method of treating dried prunes comprising immersing the fruit in water of a temperature of approximately 120° C. for 4–5 minutes while preventing said water from boiling, and abruptly cooling said fruit to inhibit thermal browning of the flesh thereof.

2. A method of treating dried prunes comprising forming a water-fruit mixture, heating said mixture to a temperature of approximately 120° C. while maintaining it under a pressure sufficient to prevent boiling of the water, holding said mixture under said temperature and pressure conditions for 4–5 minutes and abruptly reducing the temperature of said mixture to approximately but not less than 60° C. to inhibit thermal browning of the flesh of said fruit.

3. A method of treating dried prunes comprising forming a water-fruit mixture, pressurizing said mixture to prevent the boiling of the water at a temperature of approximately 120° C., heating said mixture to a temperature of approximately 120° C., maintaining said mixture at said temperature for 4–5 minutes while causing the water component of said mixture to move about the fruit component thereof, abruptly cooling said mixture sufficiently rapidly to inhibit thermal browning of the flesh of said fruit, and de-pressurizing said mixture.

4. A method of treating dried prunes to increase the moisture content to the desired level and to tenderize said fruit comprising immersing the fruit in superheated water, the temperature of said water and the period of immersion being such as to effect in said fruit a moisture content increase and a degree of tenderization substantially corresponding to such produced in said fruit by immersion of the same for 4–5 minutes in superheated water, of a temperature of approximately 120° C., and thereafter abruptly cooling said fruit to inhibit thermal browning of the flesh thereof.

References Cited in the file of this patent

UNITED STATES PATENTS

| | | |
|---|---|---|
| 1,976,961 | Pape | Oct. 16, 1934 |
| 2,092,777 | Rey | Sept. 14, 1937 |
| 2,115,382 | Campbell et al. | Apr. 26, 1938 |
| 2,124,896 | Rey | July 26, 1938 |
| 2,143,903 | Wilbur | Jan. 17, 1939 |
| 2,411,896 | Richmond et al. | Dec. 3, 1946 |